United States Patent [19]

Kramer

[11] 4,175,333

[45] Nov. 27, 1979

[54] MAGNETIC COMPASS

[75] Inventor: Melvin G. Kramer, Riverton, Wyo.

[73] Assignee: The Brunton Company, Riverton, Wyo.

[21] Appl. No.: 906,427

[22] Filed: May 16, 1978

[51] Int. Cl.² .............................................. G01C 17/04
[52] U.S. Cl. .................................... 33/344; 33/355 R
[58] Field of Search .................. 33/355, 346, 344, 345, 33/356

[56] References Cited

U.S. PATENT DOCUMENTS

| 1,016,732 | 2/1912 | Berger | 33/355 |
| 2,027,952 | 1/1936 | Bandoly | 33/355 |
| 2,446,568 | 8/1948 | Wolfe | 33/344 X |
| 3,191,306 | 6/1965 | Kierans | 33/355 |

FOREIGN PATENT DOCUMENTS 539845  4/1922  France ........................................ 33/355

*Primary Examiner*—William D. Martin, Jr.
*Attorney, Agent, or Firm*—Reilly and Young

[57] ABSTRACT

A magnetic compass has been devised which is of the type having a pivot point displaced above the plane of the permanent magnets so that the distance of displacement of the pivot point with respect to the center of force will reduce the tilt angle or tipping otherwise caused by changes in latitude when the compass is to be operated in different parts of the world and a spherical needle bearing can be employed at the pivot point as a result of the increased pendular effect achieved by displacing the pivot point above the magnets. The need for a lift assembly to cushion the pivot point is eliminated while providing for an extremely rugged and versatile magnetic compass which will serve as a light, portable pocket transit capable of measuring horizontal and vertical angles as well as being used as a prismatic compass, level, clinometer, plumb or alidade.

6 Claims, 4 Drawing Figures

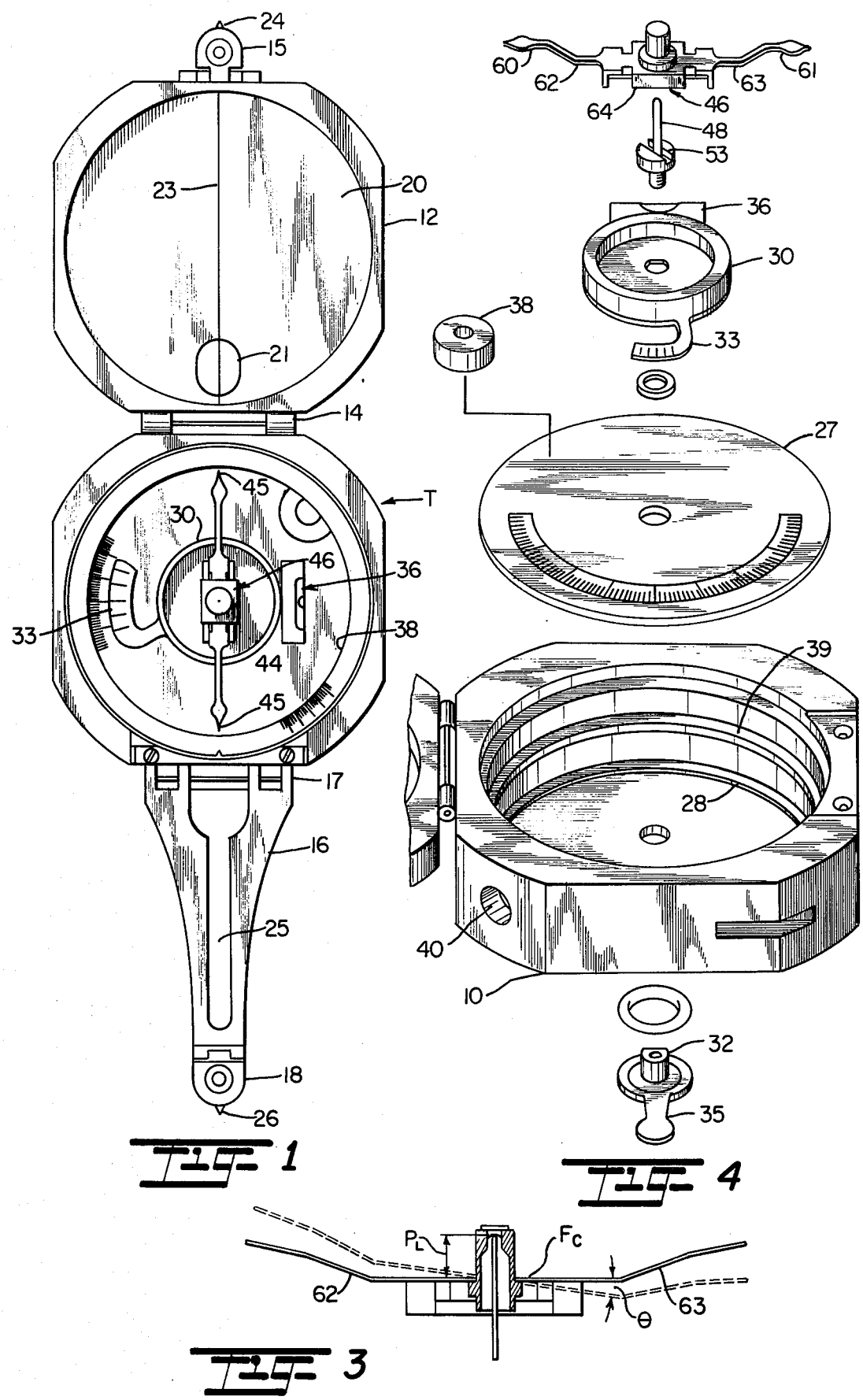

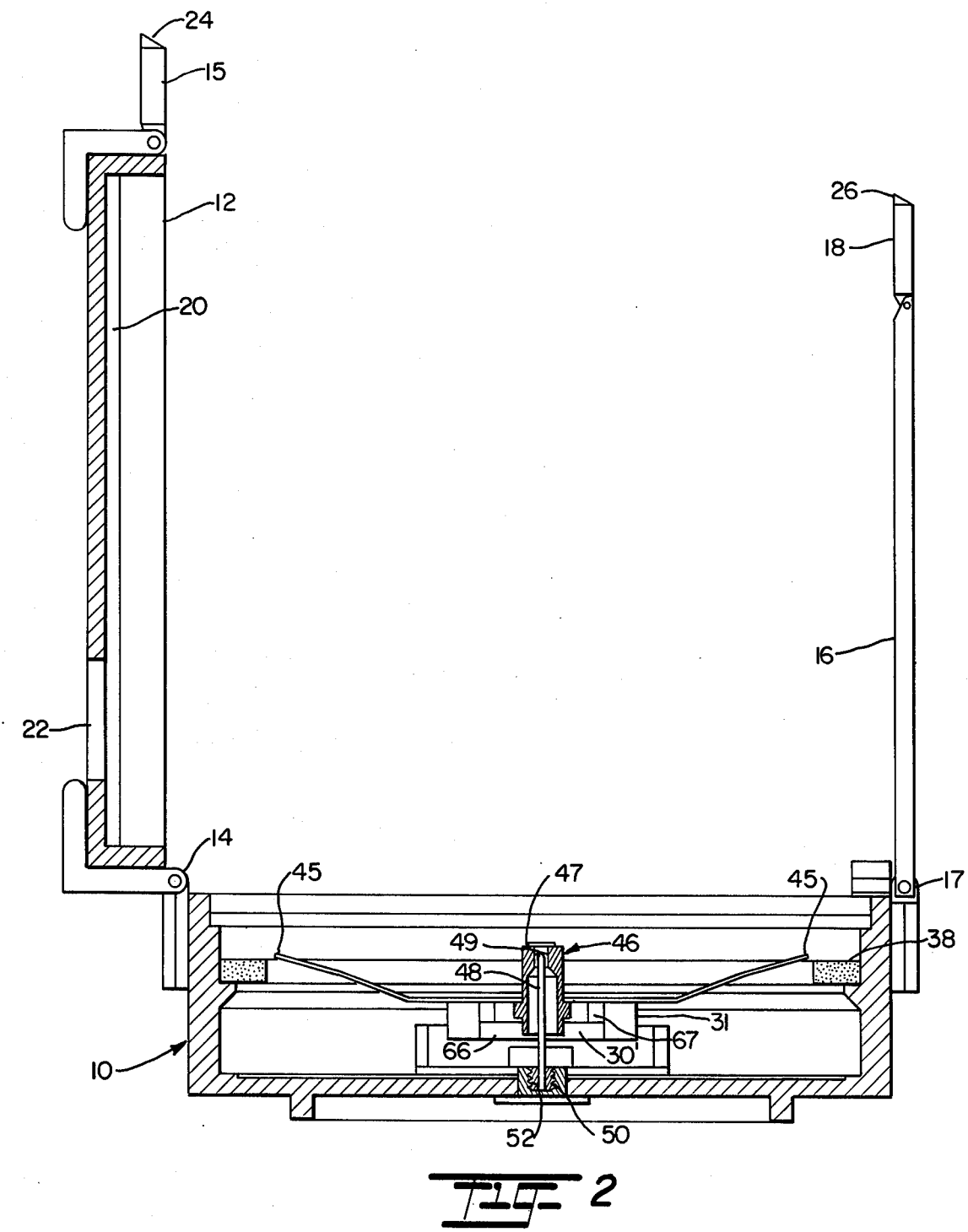

MAGNETIC COMPASS

This invention relates to a novel and improved magnetic compass; and more particularly relates to the novel and improved pocket transit incorporating a magnetic compass assembly which may either be hand-held or tripod mounted and is conformable for use in various different applications such as for instance, measuring horizontal and vertical angles, operating as a prismatic compass, level, clinometer, plumb or alidade.

BACKGROUND OF THE INVENTION

The assignee of the present invention, The Brunton Company of Riverton, Wy., has for the past several decades manufactured and sold portable transits incorporating a magnetic compass in which the needle and magnet assembly were mounted on a jewel bearing not only to provide precise compass readings but also to operate in combination with a pair of sights and a graduated scale for measuring angles and grades. The Brunton transit possesses a number of other features, such as, for instance, induction damping which will allow the needle to seek magnetic north and come to a complete rest in an extremely short time. Induction damping is achieved through the utilization of a damper pan upon which the needle and magnet assembly rests but, as opposed to working on the principle of friction, is a velocity dependent force, i.e., as the speed of oscillation of the needle decreases, the influence of this type of damping force also decreases so that when the needle comes to rest the influence of the induction damper is zero. The reading obtained in this manner is accurate and much quicker than one obtained with an undampened instrument.

Magnetic declination adjustment is afforded in the Brunton pocket transit in order to compensate for changes in latitude when the compass is shipped to different parts of the world. In other words, magnetic declination, that angle between magnetic north as indicated by a compass and true north, in the past has been compensated for by rotation of the graduated scale a number of degrees corresponding to the declination. Still further, by virtue of the relationship between the sight assembly, compass and vernier adjustment associated with the body of the compass, the standard pocket transit is capable of measuring various horizontal angles or courses as well as vertical angles or inclines. In the pocket transit the vernier is manually adjustable through the bottom wall of the casing and operates in cooperation with another graduated scale for measuring grade in percentages.

Generally, the magnetic vector which acts upon the needle and magnet assembly can be resolved into two force components: The horizontal component parallel to the earth's surface, and the vertical component perpendicular to the earth's surface. The horizontal component forces the permanent magnet needle of the compass to point to the north magnetic pole while the vertical component causes the needle to be tipped away from the horizontal position. In order to compensate for this effect, the vertical component of force which tends to force one end of the needle up and the other end down is balanced out by the addition of weight to the opposite end of the needle which is tipped down thus compensating for the vertical component of force causing the needle to tip and is very time consuming in the original manufacture of the compass. Moreover, since the strength of the magnetic vector components varies around the world, it is necessary to rebalance the needle at each new location, especially at locations far removed from the initial balancing point. This poses substantial problems with respect to compasses which are sealed and cannot be rebalanced without breaking the seal; also where users are not equipped to rebalance the needle or don't recognize the problem it is necessary to return the unit to the manufacturer for rebalancing. In the past it has been proposed to displace the pivot point for the needle above the permanent magnet and for example reference is made to U.S. Pat. Nos. 3,191,306 to Kiernans and 2,552,332 to LeVan. LeVan in particular discloses a graduated scale and magnet assembly in which the scale is mounted on a pivot point displaced above the magnet assembly so that in any latitude the tilt of the moving parts, i.e., the declination due to the vertical magnetic field will be minimized; and a jewel post assembly is employed with a spring-loaded stem supported in a damping cup in order to minimize damage to the surface of the jewel or pivot. To my knowledge, however, a magnetic compass assembly has not been devised which is conformable for various different applications as a compass or transit as described but which at the same time provides a needle and magnet assembly which can be operated world wide, without having to rebalance the needle at each different location; yet which will provide a rugged but sensitive and accurate needle suspension system with induction damping, obviate the need for a V-type jewel bearing and lift system for the needle support, and permit compact mounting within a minimum of space.

SUMMARY OF THE INVENTION

Accordingly it is an object of the present invention to provide for a novel and improved magnetic compass which is conformable for use in different parts of the world without necessity of rebalancing the needle.

It is another object of the present invention to provide for a magnetic compass in which the needle is free to rotate over a wider range of off-level angles, and in which a rugged needle suspension system is provided which avoids the necessity for a V-type jewel bearing for suspension of the needle or needle lift arm while being accurate and sensitive in use.

It is a further object of the present invention to provide a magnetic compass comprised of a simplified, compact assembly made up of a minimum number of parts which is rugged but sensitive in use, requires minimum adjustment and is readily conformable for various different applications either as a compass or transit; and further wherein the magnetic compass is relatively light and portable and can be either hand-held or mounted on a tripod for performing various different measurements as well as being adapted for conventional use in taking compass readings.

In accordance with the present invention, a preferred embodiment will be described as intended for use as a pocket transit for taking compass readings as well as measuring horizontal and vertical angles and specifically being adaptable for use as a prismatic compass, level, clinometer, plumb or alidade. The magnetic needle assembly is specifically designed in such a way that the needle is desensitized in its response to the vertical component of force while maintaining its sensitivity to the horizontal component. Generally the needle has two vertical forces acting upon it: the earth's gravitational field and the earth's vertical magnetic field reacting with the permanent magnets of the needle assembly. The resultant force is a point location on the needle referred to as the center of forces (CF) which is very much the same as the principle of the center of gravity. This point is horizontally offset from the axis of the pivot point so that a torque is created which rotates the needle about the pivot point until the position of the center of forces is located directly below the pivot point. In order to minimize the tilt angle, the pivot point for the needle is displaced vertically above the center of force in order to greatly minimize the amount of tipping of the needle required to locate the center of forces directly beneath the pivot point and desensitizes the needle to the vertical component of the earth's magnetic vector. Still further, the pendular effect achieved as a result of displacement of the needle above the center of forces avoids necessity for a V-type jewel bearing for the needle and permits replacement with a more rugged spherical pivot point without sacrificing compass accuracy. In the past, a needle pivot with a very sharp point was used in cooperation with a V-type jewel bearing since the sharp point in contact with the bearing was necessary to reduce friction and allow the pointer or needle assembly to align accurately with the earth's horizontal component with the magnetic field. However, the sharp pivot point could be dulled easily thereby decreasing the accuracy of the compass and required some form of lift mechanism to mechanically disengage the sharp point from the jewel bearing when the compass was not in use. Such mechanisms tend to be troublesome to adjust, are costly and they are a constant source of leaks in waterproof compasses. However, as the vertical distance from the pivot point to the center of forces is increased, the pendulum effect of the needle is also increased so that for a given weight the increase in displacement causes a proportional increase in the torque applied to the pivot point for displacement of the center of force from the resting position. Disturbing forces such as magnetic forces on the permanent magnet have the effect not only of causing the needle assembly to rotate in a horizontal plane to align with the horizontal component of the earth's magnetic vector but the rotational movement is accompanied by disturbance of the equilibrium position of the pendular mass. The net effect is that the mass is caused to oscillate in a vertical plane and which oscillations are of a nature such that the energy stored to energy dissipated per cycle is high and therefore the pendular movement requires a relatively long period of time to stop after being excited or initiated. It is well known that a greater force is required to start a body from a state of rest than merely to keep it in motion, and by maintaining the pendular motion of the needle assembly, the horizontal rotational movement must only overcome the kinetic friction of the pivot, since the static friction is overcome by the pendular movement of the needle assembly. Accordingly, this enables not only the use of a more rugged spherical bearing but also permits elimination of a special lift or a suspension system while permitting continued use of a dampener pan in direct association with the needle assembly for the purpose of induction damping.

Notwithstanding vertical displacement of the pivot point above the plane of the needle and magnets at their connection to the central mounting, the needle arms are displaced upwardly so that their tips are aligned in the plane of the pivot point so as to negate the effect on the needle of tilting of the compass body transversely of the needle assembly.

BRIEF DESCRIPTION OF THE DRAWINGS

The above and other advantages of the present invention will become more readily appreciated and understood from a consideration of the following detailed description of a preferred embodiment thereof when taken with the accompanying drawings, in which:

FIG. 1 is a plan view of a magnetic compass in accordance with the present invention.

FIG. 2 is a view partially in section of the preferred form of magnetic compass shown in FIG. 1.

FIG. 3 is a cross-sectional view of the needle and magnet assembly representing the tilt angle as a function of the displacement or vertical distance of the pivot point above the horizontal plane passing through the center of forces; and FIG. 4 is an exploded view of the compass assembly.

DETAILED DESCRIPTION OF THE PREFERRED EMBODIMENT

Referring to the drawings, there is shown by way of illustrative example in FIGS. 1 to 4 a magnetic compass in the form of a portable or hand-held transit generally designated at T which is broadly comprised of an annular body 10, a cover 12 which is hinged as at 14 to one sidewall of the body and provided with a sight 15 at its outer free end; and an arm 16 is hinged as at 17 to the diametrically opposed side of the body 10 and has a sight 18 at the opposite free end of the arm 16. The cover 12 is provided with a mirror 20 on its inner surface which as viewed in FIG. 1 is disposed in facing relation to the sight assembly 16 and the mirror has an offset window 21 aligned with an opening 22 in the wall of the cover to permit viewing therethrough. In addition, a center line 23 is formed on the surface of the glass and the viewing window 21 which is aligned with a central tip 24 on the sight 15. In turn, the sight 15 has an elongated slot 25 which is formed symmetrically within the arm 16 and is similarly aligned with the tip 26 on the end of the sight 18. The general organization of parts as described above for use in a portable transit is conventional and is described herein more as a setting for the present invention.

The annular body or casing 10 of the transit T includes a graduated scale 27 formed on bottom plate 28 of the body, and a dampener pan 30 is centered over the bottom plate and is secured to a stem 32 projecting upwardly through a central aperture in the bottom plate 31 of the body. A vernier 33 projects in a radial direction from the outer peripheral wall 31 of the pan and a lever arm 35 is affixed to the external end of the stem to permit manual adjustment of the vernier. The pan 30 also supports a long level 36 on its external surface and the entire dampener assembly as described is rotatable when it is desired to adjust the vernier by turning the lever 35. A round level 37 is positioned in the bottom of the body 10, and a rotatably adjustable azimuth ring 38 is supported on ledge 39 internally of the body which is rotatably adjustable by means of an adjustment screw 40 extending through the wall of the body and having dog points, not shown, intermeshing with mating teeth molded on the external edge of the azimuth ring so that in a well-known manner the azimuth ring may be adjusted to compensate for declination of the compass in different latitudes.

An important feature of the present invention resides in the needle assembly generally designated at 44 and its use in cooperation with the other parts of the portable transit as described for precise compass readings and in measuring different horizontal and vertical angles. The needle assembly is comprised of needles or pointers 45 extending in diametrically opposed radial directions from a central pivot mount 46, the latter being hollow with an upper closed end or cap 47, commonly referred to as a cup jewel, providing an internal concave seat which is suspended on a pivot pin 48 having a generally spherical bearing 49. The lower end of the pivot pin 48 is inserted into the hollow central bore of a slotted screw 50 which is threaded into an internally threaded counterbore portion 52 of the stem 32 with the enlarged slotted head 53 of the screw bearing against the bottom wall 30' of the dampener pan 30 and with the upstanding annular wall 31 disposed in outer spaced concentric relation to the slotted screw 50. In the relationship described wherein the vernier is attached to the bottom of the dampener pan 30 and the long level 36 attached to the opposite side of the dampener pan, all form one integral part which is assembled together with the pivot pin in the bottom of the body so as to provide ample space for vertical displacement of the pivot point without increasing the depth of the body 10.

The needle 45 is comprised of first and second pointers 60 and 61 extending in diametrically opposite directions from the mount 46, each pointer 60 and 61 inclining upwardly from an inner horizontal arm portion 62 and 63, respectively, the horizontal arm portions 62 and 63 radiating from and forming a part of a central clip 64 which is supported on and affixed to a ledge 65 of the mount and is downturned so as to be bent or wrapped around a pair of oppositely directed permanent magnets 66 and 67 which are bonded or otherwise firmly attached beneath the arm members 62 and 63, respectively.

As represented in FIG. 3, the vertical distance or displacement of the pivot point above the horizontal plane passing through the arm portions 62 and 63 and is represented at $p_l$, and the center of forces through the arm portions 62 and 63 is represented at $F_C$. Generally the needle has two vertical forces acting upon it: the earth's gravitational field and the earth's vertical magnetic field reacting with the permanent magnets of the needle assembly. The resultant force is a point location on the needle referred to as its center of forces which is horizontally offset from the axis of the pivot point so that a torque is created which tends to rotate the needle about the pivot point until the position of the center of forces is located directly below the pivot point. It will be appreciated that if the horizontal plane in which the center of forces is located were located approximately in the plane of the pivot point substantial tipping would be required in order to locate the center of forces $F_C$ directly beneath the pivot point. In order to compensate for this effect, in the past the vertical component of force tipping one end of the needle up and the other end down is counter balanced by the addition of weight to the needle. However, the strength of the magnetic vector components vary widely at different latitudes so as to normally require rebalancing when the compass is to be used in different parts of the world. In accordance with the present invention however rebalancing is obviated by the vertical displacement as described between the pivot point and horizontal plane of the center of forces so as to minimize the tilt angle between those points. The advantage of vertical displacement can be readily seen from the following expression:

$$\tan \theta = L/p_L$$

where $\theta$ is the tilt angle, L is the horizontal location of $F_C$ from the center line of the pivot point, and $p_L$ is the vertical distance as represented in FIG. 3

By minimizing the ratio of $L/p_L$, $\theta$ is also reduced. For instance, $p_L$ in a conventional design is on the order of 0.04 inches whereas in the new design $p_L$ is 0.40 inches. Accordingly, in a conventional design where, as a result of a change in latitude, $\theta$ would be on the order of 13°, in accordance with this invention $\theta$ would be on the order of 1.32° for the same change in latitude and therefore is well within the permissible limits of the tilt angle without necessity of rebalancing of the needle. At the same time by inclining the pointers of the needle upwardly away from the horizontal plane of the center of forces, the pointers will be horizontally aligned with the pivot point so as not to be subject to tilting of the body in a direction transverse to the direction of the needle.

The compact mounting of the dampener pan together with the vernier and level as a unit on the bottom wall or plate of the body as described affords more than adequate space for the vertical displacement of the pivot point and center of forces without increasing the depth of the body over that of the standard Brunton transit. As stated earlier, as this vertical distance from the pivot point to the center of forces is increased the pendulum effect is also increased so as to enable the use of a spherical or relatively blunt pivot point, as opposed to sharp pivot points required with a jewel bearing arrangement. In other words by maintaining pivot movement by the pendular motion of the needle assembly the horizontal rotational movement must only overcome the kinetic friction of the pivot since the static friction of the pivot is overcome by the pendular movement of the needle assembly. The result is a pivot system which is rugged but accurate and is greatly simplified in that it obviates the need for a special lift mechanism to disengage the pivot when not in use. Still further error is not generated nor are the oscillations objectionable to the user since the pendular oscillation does not occur as rotation in the horizontal plane; and the slight up and down vertical movement of the needle is desirable from a human engineering standpoint since it is an indication that the needle is free to rotate and is functioning.

From the foregoing it will be recognized that a precision compass has been devised which is greatly simplified but sensitive and accurate as well as being extremely versatile and readily conformable for use not only as a compass but as a precision portable transit. The techniques followed in utilizing the transit for measuring various angles will not be described in any detail since such techniques are well known to those skilled in the art. It is to be understood from the foregoing that while there is set forth and described a preferred embodiment of the present invention specifically adaptable for use as a portable or hand-held transit that various modifications and changes in size, construction and arrangement of parts may be resorted to without departing from the spirit and scope of the present invention.

What is claimed is:
1. A magnetic compass comprising in combination:
an annular body having a bottom wall;

an upstanding pivot member including a pivot pin having a spherical end surface at its upper end, said pivot pin being centrally located to project upwardly from said bottom wall;

a needle assembly mounted on said pivot member including a centrally located pivot mount provided with an axially extending pin-receiving bore therein terminating in a downwardly facing concave seat at the upper end of sid pivot mount, said concave surface resting upon the upper spherical end surface of said pivot pin, pointer arms extending radially in diametrically opposite directions from a location on said pivot mount vertically spaced substantially beneath said concave seat, and magnets disposed beneath said pointer arms; and an azimuth ring disposed in outer spaced concentric relation to said pivot mount.

2. A magnetic compass according to claim 1, including a induction damping means disposed beneath said needle assembly to damp the rotational movement of said needle assembly.

3. A magnetic compass according to claims 1 or 2, said pointer arms terminating in needle tips substantially horizontally aligned with said concave seat.

4. A magnetic compass according to claim 1, said needle assembly characterized by radially extending arm portions including inner radial arms extending horizontally from the lower end of said pivot mount and outer radial arm portions inclining upwardly from said inner radial arms and terminating in horizontally extending needle tips aligned with the pivot point defined by the interface between said pivot member and concave seating surface.

5. In a portable transit having an annular body, a cover hinged thereto, and a bottom wall in said body having a graduated scale with a central opening extending through said bottom wall, comprising:

an upstanding pin located in said opening to project upwardly from said bottom wall and terminating in a spherical bearing surface at its upper end;

a needle assembly including a centrally located pivot mount mounted on said pivot pin, said pivot mount including an axially extending pivot pin-receiving bore therein terminating in a concave seat at the upper closed end of said pivot mount, magnetic pointer arms extending radially in diamtrically opposite directions from the lower end of said pivot mount in vertically spaced relation beneath the concave seat at the upper end of said pivot mount, and terminating in needle tips substantially horizontally aligned with said concave seat;

a dampener pan including a radially extending vernier, and lever arm means on the external surface of said bottom wall and keyed to said dampener pan through said central opening to selectively rotate said vernier with respect to a graduated scale on the bottom wall of said body; and an azimuth ring disposed in outer spaced concentric relation to said pivot mount.

6. In a portable transit according to claim 5, said needle assembly characterized by said radially extending pointer arm portions including inner radial arms extending horizontally from the lower end of said pivot mount and outer radial arm portions inclining upwardly from said inner radial arms and terminating in horizontally extending needle tips aligned with the pivot point defined by the interface between said pivot member and concave seating surface.

* * * * *